United States Patent
Yang et al.

(10) Patent No.: US 11,775,379 B1
(45) Date of Patent: Oct. 3, 2023

(54) METHOD AND APPARATUS FOR SOFTWARE RELEASE MANAGEMENT

(71) Applicant: Verkada Inc., San Mateo, CA (US)

(72) Inventors: Yu Yang, Palo Alto, CA (US); Hanhong Gao, Fremont, CA (US); Han Cao, San Mateo, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/182,107

(22) Filed: Mar. 10, 2023

(51) Int. Cl.
| | |
|---|---|
| *G06F 9/44* | (2018.01) |
| *G06F 11/14* | (2006.01) |
| *G06F 8/71* | (2018.01) |
| *G06F 21/57* | (2013.01) |
| *G06F 11/07* | (2006.01) |
| *G06F 8/60* | (2018.01) |

(52) U.S. Cl.
CPC ............ *G06F 11/0793* (2013.01); *G06F 8/60* (2013.01)

(58) Field of Classification Search
CPC .......... G06F 11/0793; G06F 8/60; G06F 8/64; G06F 8/654; G06F 8/35; G06F 8/20; G06Q 20/28; G06Q 20/40; G06Q 20/3227; G06Q 20/356; G06Q 20/322; G06Q 20/3821; G06Q 20/3278; G06Q 20/405; H04L 63/0876; H04L 67/34
See application file for complete search history.

(56) References Cited

U.S. PATENT DOCUMENTS 11,176,254 B2 * 11/2021 Singer ................ G06F 11/0757

OTHER PUBLICATIONS

Sun et al., Design of Over-the-Air Firmware Update and Management for IoT Device with Cloud-based RESTful Web Services, 5 pages (Year: 2021).*

* cited by examiner

*Primary Examiner* — Thuy Dao
(74) *Attorney, Agent, or Firm* — COOLEY LLP

(57) ABSTRACT

A first set of values reported by an electronic device and not reported by another electronic device over a first period of time that is prior to a firmware release to the electronic device is received. The first set of values is associated with a metric. A set of statistical properties associated with the first set of values is determined. A second set of values reported by the electronic device and not reported by another electronic device over a second period of time that is after the firmware release is received. The second set of values is associated with the metric. A set of statistical properties associated with the second set of values is determined. The set of statistical properties associated with the first set of values and the set of statistical properties associated with the second set of values is compared to detect an anomaly.

20 Claims, 8 Drawing Sheets

| camera_id | release_name | metric_name | mean | stddev | samp | date |
|---|---|---|---|---|---|---|
| 8359ca11-8c73-47 | overflow-1-2 | avg_idle_cpu | 0.8284996150 | 8.862664263 | 2 | 2022-04-25 |
| 8359ca11-8c73-47 | overflow-1-2 | p70_sys_cpu | 0.17584262 | 2.955847766 | 2 | 2022-04-25 |
| 8359ca11-8c73-47 | overflow-1-2 | p75_idle_cpu | 0.34276375 | 4.820346927 | 2 | 2022-04-25 |
| 8359ca11-8c73-47 | overflow-1-2 | p70_user_cpu | 0.273096565 | 6.065349836 | 2 | 2022-04-25 |
| 8359ca11-8c73-47 | overflow-1-2 | p50_sys_cpu | 0.163134685 | 0.006048626 | 2 | 2022-04-25 |

FIG. 2

| camera_id | baseline_relea | current_relea | metric_name | value | mean | stddev | z_score | delta | date |
|---|---|---|---|---|---|---|---|---|---|
| 8359ca11-8c73-47 | overflow-0-8 | overflow-1-2 | p70_iowait_cpu | 0.0016440086 | 0.00107737 | 3.3170668935 | 16.963971 | 5.6270626E | 2022-04-25 |
| a3a1cd2a-fd84-41 | overflow-0-8 | overflow-1-2 | p90_idle_cpu | 0.8054756 | 0.77358506 | 5.4420478790 | 58.600230 | 0.03189053C | 2022-04-25 |
| 62aa75a5-47aa-4t | overflow-0-8 | overflow-1-2 | p70_user_cpu | 0.108582430 | 0.125446620 | 3.418070633 | -493.0907 | -0.016854190 | 2022-04-25 |
| c1628d50-f332-42 | overflow-0-8 | overflow-1-2 | p70_idle_cpu | 0.7569362 | 0.70807632 | 5.070048707 | 96.369640 | 0.048859870 | 2022-04-25 |

301    303    305    307    309    311    313    315    317    319

FIG. 3 model name: ALL_MODELS camera_load_average

| Metric Name | Comparison | 2022-04-23 | 2022-04-24 | 2022-04-25 | 2022-04-26 | 2022-04-27 | 2022-04-28 | 2022-04-29 | 2022-04-30 | 2022-05-01 | 2022-05-02 | 2022-05-03 |
|---|---|---|---|---|---|---|---|---|---|---|---|---|
| max_15min_load | current | 7.8 | 7.2 | 7.09 | 7.38 | 6.89 | 7.37 | 7.15 | 6.74 | 6.57 | 6.75 | 6.74 |
| | baseline | 6.531 | 6.531 | 6.531 | 6.531 | 6.531 | 6.531 | 6.58 | 6.531 | 6.58 | 6.58 | 6.58 |
| | delta | 1.269 | 0.669 | 0.559 | 0.849 | 0.359 | 0.839 | 0.57 | 0.209 | -0.01 | 0.17 | 0.16 |
| max_1min_load | current | 15.0 | 10.13 | 10.77 | 10.03 | 10.16 | 10.63 | 10.73 | 10.39 | 9.88 | 11.05 | 10.2 |
| | baseline | 11.224 | 11.224 | 11.224 | 11.224 | 11.224 | 11.224 | 11.343 | 11.224 | 11.343 | 11.343 | 11.343 |
| | delta | 3.776 | -1.094 | -0.454 | -1.194 | -1.064 | -0.594 | -0.613 | -0.834 | -1.463 | -0.293 | -1.143 |
| max_5min_load | current | 8.97 | 7.74 | 8.41 | 7.9 | 7.6 | 8.3 | 8.74 | 8.41 | 7.37 | 7.82 | 7.94 |
| | baseline | 8.291 | 8.291 | 8.291 | 8.291 | 8.291 | 8.291 | 8.315 | 8.291 | 8.315 | 8.315 | 8.315 |
| | delta | 0.679 | -0.551 | 0.119 | -0.391 | -0.691 | 0.009 | 0.425 | 0.119 | -0.945 | -0.495 | -0.375 |
| p50_15min_load | current | 4.71 | 4.1 | 4.1 | 4.13 | 4.21 | 4.29 | 4.33 | 4.31 | 4.39 | 4.6 | 4.57 |
| | baseline | 4.518 | 4.518 | 4.518 | 4.518 | 4.518 | 4.518 | 4.62 | 4.518 | 4.62 | 4.62 | 4.62 |
| | delta | 0.192 | -0.418 | -0.418 | -0.388 | -0.308 | -0.228 | -0.29 | -0.208 | -0.23 | -0.02 | -0.05 |
| p50_1min_load | current | 4.44 | 4.17 | 4.2 | 4.14 | 4.16 | 4.31 | 4.32 | 4.22 | 4.25 | 4.42 | 4.44 |
| | baseline | 4.154 | 4.154 | 4.154 | 4.154 | 4.154 | 4.154 | 4.157 | 4.154 | 4.157 | 4.157 | 4.157 |
| | delta | 0.286 | 0.016 | 0.046 | -0.014 | 0.006 | 0.156 | 0.163 | 0.066 | 0.093 | 0.263 | 0.283 |
| p50_5min_load | current | 4.48 | 4.17 | 4.19 | 4.16 | 4.18 | 4.32 | 4.37 | 4.26 | 4.31 | 4.47 | 4.49 |
| | baseline | 4.417 | 4.417 | 4.417 | 4.417 | 4.417 | 4.417 | 4.496 | 4.417 | 4.496 | 4.496 | 4.496 |
| | delta | 0.063 | -0.247 | -0.227 | -0.257 | -0.237 | -0.097 | -0.126 | -0.157 | -0.186 | -0.026 | -0.006 |
| p70_15min_load | current | 5.05 | 4.6 | 4.61 | 4.55 | 4.5 | 4.74 | 4.79 | 4.57 | 4.72 | 4.96 | 4.83 |
| | baseline | 5.027 | 5.027 | 5.027 | 5.027 | 5.027 | 5.027 | 5.028 | 5.027 | 5.028 | 5.028 | 5.028 |
| | delta | 0.023 | -0.427 | -0.417 | -0.477 | -0.527 | -0.287 | -0.238 | -0.457 | -0.308 | -0.068 | -0.198 |

FIG. 4

Receiving a first set of values reported by an electronic device over a first period of time that is prior to a firmware release to the electronic device, the first set of values associated with a plurality of metrics 501

Determine, for each metric from the plurality of metrics, a set of statistical properties associated with a subset of values included in the first set of values that are associated with that metric 502

Receive a second set of values reported by the electronic device over a second period of time that is after the firmware release, the second set of values associated with the plurality of metrics 503

Determine, for each metric from the plurality of metrics, a set of statistical properties associated with a subset of values included in the second set of values that are associated with that metric 504

Compare, for each metric from the plurality of metrics, to detect an anomaly associated with at least one of the firmware release or the electronic device, and without using a third set of values that are associated with that metric and reported by a different electronic device that is not the electronic device, (1) the set of statistical properties associated with the subset of values included in the first set of values associated with that metric with (2) the set of statistical properties associated with the subset of values included in the second set of values associated with that metric 505

Send, automatically in response to detecting the anomaly, a signal to cause a remedial action 506

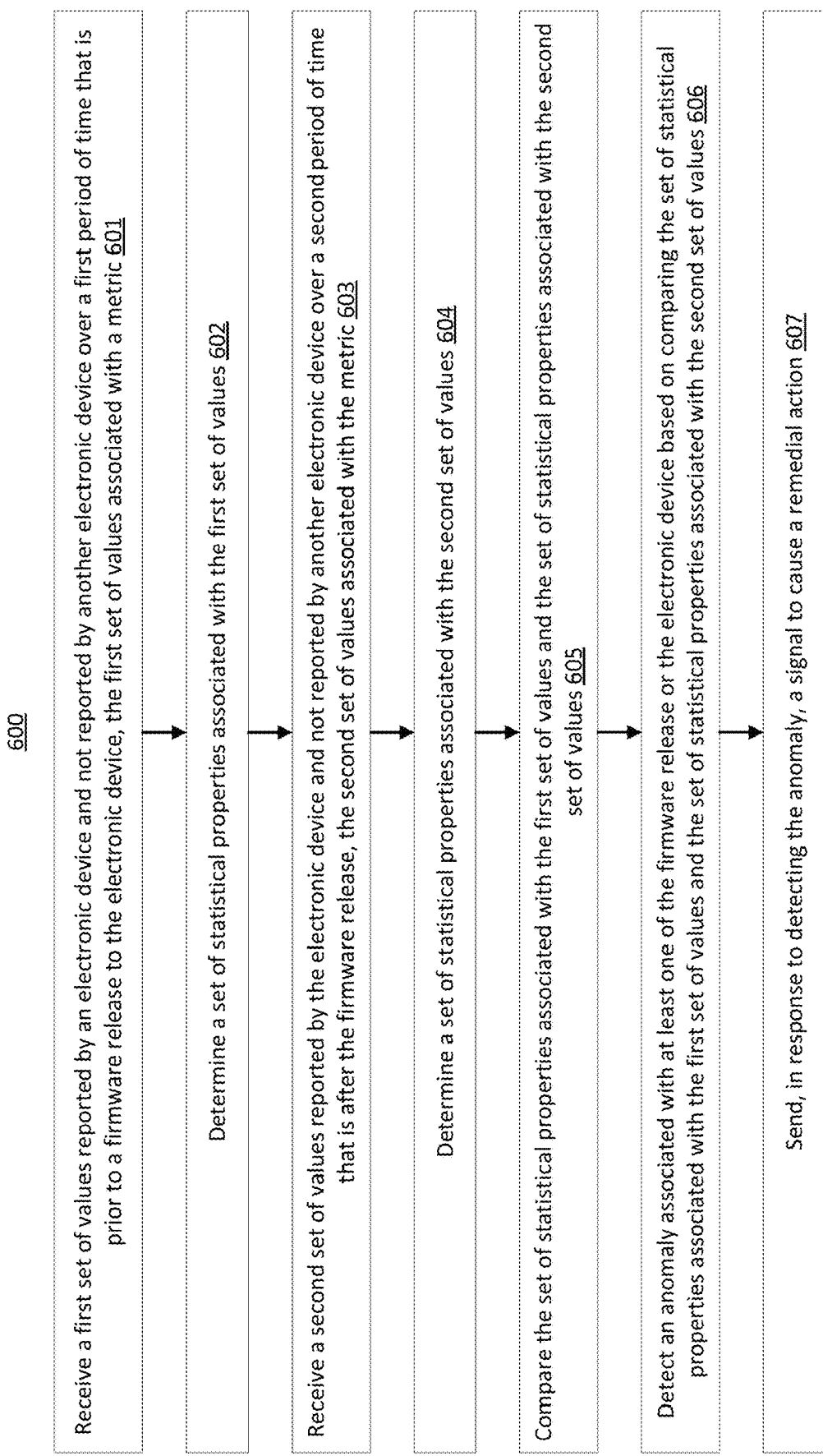

Receive a first plurality of sets of values reported by a plurality of electronic devices over a first period of time that is prior to a firmware release to the plurality of electronic devices, the first plurality of sets of values associated with a set of metrics, each set of values from the first plurality of sets of values associated with an electronic device from the plurality of electronic devices different than remaining sets of values from the first plurality of sets of values 701

For each set of values from the first plurality of sets of values, determine, for each metric from the set of metrics and to generate a first plurality of sets of statistical properties associated with the first plurality of sets of values, a set of statistical properties associated with a subset of values included in that set of values that are associated with that metric 702

Receive a second plurality of sets of values reported by the plurality of electronic devices over a second period of time that is after the firmware release, the second plurality of sets of values associated with the set of metrics, each set of values from the second plurality of sets of values associated with a electronic device from the plurality of electronic devices different than remaining sets of values from the second plurality of sets of values 703

For each set of values from the second plurality of sets of values, determine, for each metric from the set of metrics and to generate a second plurality of sets of statistical properties associated with the second plurality of sets of values, a set of statistical properties associated with a subset of values included in that set of values that are associated with that metric 704

Continuing at FIG. 7B

FIG. 7A

*Continuing from FIG. 7A*

Determine, for an electronic device included in the plurality of electronic devices, an anomaly (1) based on comparing the set of statistical properties associated with the subset of values included in the first set of values that are associated with a metric included in the plurality of metrics with the set of statistical properties associated with the subset of values included in the second set of values that are associated with the metric and (2) that is associated with at least one of the firmware release or the electronic device, the comparing occurring without consideration of (a) remaining sets of statistical properties included in the first plurality of sets of statistical properties different than the set of statistical properties associated with the subset of values included in the first set of values that are associated with the metric and (b) remaining sets of statistical properties included in the second plurality of sets of statistical properties different than the set of statistical properties associated with the subset of values included in the second set of values that are associated with the metric 705

Send, in response to determining the anomaly, a signal to cause a remedial action 706

FIG. 7B

METHOD AND APPARATUS FOR SOFTWARE RELEASE MANAGEMENT

FIELD

One or more embodiments are related to a method and apparatus for software release management.

BACKGROUND

A firmware release may cause an anomaly at, for example, the electronic device receiving the firmware release. Known techniques to detect anomalies caused by firmware releases have drawbacks such as having a high false positive ratio or not being able to report results of statistical significance due to small sample size.

SUMMARY

In an embodiment, a method includes receiving, via a processor, a first set of values reported by an electronic device over a first period of time that is prior to a firmware release to the electronic device. The first set of values is associated with a plurality of metrics. The method further includes determining, via the processor and for each metric from the plurality of metrics, a set of statistical properties associated with a subset of values included in the first set of values that are associated with that metric. The method further includes receiving, via the processor, a second set of values reported by the electronic device over a second period of time that is after the firmware release. The second set of values is associated with the plurality of metrics. The method further includes determining, via the processor and for each metric from the plurality of metrics, a set of statistical properties associated with a subset of values included in the second set of values that are associated with that metric. The method further includes comparing, via the processor, for each metric from the plurality of metrics, to detect an anomaly associated with at least one of the firmware release or the electronic device, and without using a third set of values that are associated with that metric and reported by a different electronic device that is not the electronic device, (1) the set of statistical properties associated with the subset of values included in the first set of values associated with that metric with (2) the set of statistical properties associated with the subset of values included in the second set of values associated with that metric. The method further includes sending, via the processor and automatically in response to detecting the anomaly, a signal to cause a remedial action.

In an embodiment, a non-transitory processor-readable medium stores code representing instructions to be executed by one or more processors. The instructions comprise code to cause the one or more processors to receive a first set of values reported by an electronic device and not reported by another electronic device over a first period of time that is prior to a firmware release to the electronic device. The first set of values is associated with a metric. The instructions further comprise code to cause the one or more processors to determine a set of statistical properties associated with the first set of values. The instructions further comprise code to cause the one or more processors to receive a second set of values reported by the electronic device and not reported by another electronic device over a second period of time that is after the firmware release. The second set of values is associated with the metric. The instructions further comprise code to cause the one or more processors to determine a set of statistical properties associated with the second set of values. The instructions further comprise code to cause the one or more processors to compare the set of statistical properties associated with the first set of values and the set of statistical properties associated with the second set of values. The instructions further comprise code to cause the one or more processors to detect an anomaly associated with at least one of the firmware release or the electronic device based on comparing the set of statistical properties associated with the first set of values and the set of statistical properties associated with the second set of values. The instructions further comprise code to cause the one or more processors to send, in response to detecting the anomaly, a signal to cause a remedial action.

In an embodiment, an apparatus includes a memory and a processor operatively coupled to the memory. The processor is configured to receive a first plurality of sets of values reported by a plurality of electronic devices over a first period of time that is prior to a firmware release to the plurality of electronic devices. The first plurality of sets of values is associated with a set of metrics. Each set of values from the first plurality of sets of values is associated with an electronic device from the plurality of electronic devices different than remaining sets of values from the first plurality of sets of values. For each set of values from the first plurality of sets of values, the processor is further configured to determine, for each metric from the set of metrics and to generate a first plurality of sets of statistical properties associated with the first plurality of sets of values, a set of statistical properties associated with a subset of values included in that set of values that are associated with that metric. The processor is further configured to receive a second plurality of sets of values reported by the plurality of electronic devices over a second period of time that is after the firmware release. The second plurality of sets of values is associated with the set of metrics. Each set of values from the second plurality of sets of values is associated with an electronic device from the plurality of electronic devices different than remaining sets of values from the second plurality of sets of values. For each set of values from the second plurality of sets of values, the processor is further configured to determine, for each metric from the set of metrics and to generate a second plurality of sets of statistical properties associated with the second plurality of sets of values, a set of statistical properties associated with a subset of values included in that set of values that are associated with that metric. The processor is further configured to determine, for an electronic device included in the plurality of devices, an anomaly (1) based on comparing the set of statistical properties associated with the subset of values included in the first set of values that are associated with a metric included in the plurality of metrics with the set of statistical properties associated with the subset of values included in the second set of values that are associated with the metric and (2) that is associated with at least one of the firmware release or the electronic device. The comparing occurs without consideration of (a) remaining sets of statistical properties included in the first plurality of sets of statistical properties different than the set of statistical properties associated with the subset of values included in the first set of values that are associated with the metric and (b) remaining sets of statistical properties included in the second plurality of sets of statistical properties different than the set of statistical properties associated with the subset of values included in the second set of values that are associated with the metric. The processor is further configured to send, in response to determining the anomaly, a signal to cause a remedial action.

BRIEF DESCRIPTION OF THE DRAWINGS

FIG. 2 shows an example of metrics and statistical properties associated with a camera, according to an embodiment.

FIG. 3 shows an example of metrics and statistical properties associated with multiple different cameras, according to an embodiment.

FIG. 4 shows an example of statistical values associated with a plurality of cameras that are all the same model across a range of dates, according to an embodiment.

FIG. 5 shows a flowchart of a method for causing a remedial action in response to detecting an anomaly, according to an embodiment.

FIG. 6 shows a flowchart of a method for causing a remedial action in response to detecting an anomaly, according to an embodiment.

FIGS. 7A-7B show a flowchart of a method for causing a remedial action in response to detecting an anomaly, according to an embodiment.

DETAILED DESCRIPTION

Figure 1:
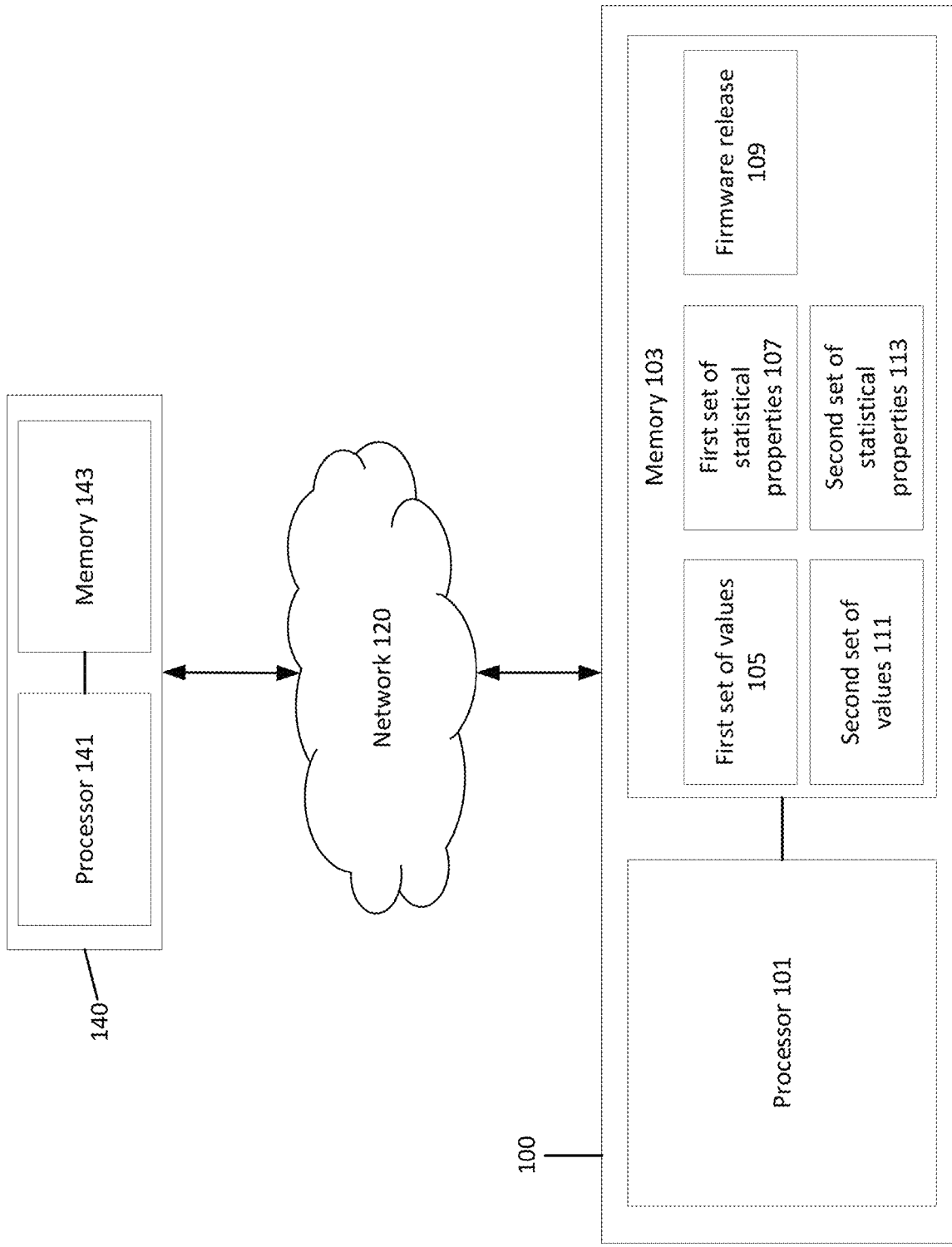
FIG. 1 shows a block diagram of a system to detect an anomaly after a firmware release, according to an embodiment.

Values (e.g., values measured by sensors, intrinsic parameters, extrinsic parameters, and/or the like) collected at an internet-of-things (IOT) device are analyzed prior to and after a firmware release. A comparison of both sets of values can be performed to determine if an anomaly was caused due to the new firmware/firmware release. Some techniques discussed herein allow an anomaly to be detected without human intervention, enabling the anomaly to be detected faster than if a human was involved. Additionally, some techniques discussed herein allow an anomaly to be detected using data from a single IOT device (rather than a set of multiple IOT devices), enabling the anomaly to be detected without limited sample size being an obstacle. Additionally, some techniques discussed herein allow an IOT device to operate more efficiently, more accurately, and/or more in-line with an intended design, as anomalies caused by a firmware release can be detected and mitigated.

FIG. 1 shows a block diagram of a system to detect an anomaly after a firmware release, according to an embodiment. FIG. 1 includes an anomaly detection compute device 100 communicably coupled to an internet-of-things (IOT) compute device 140 via a network 120.

The network 120 can be any suitable communications network for transferring data, for example operating over public and/or private communications networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi® or wireless local area network ("WLAN"), a wireless wide area network ("WWAN"), and/or a cellular network. In other instances, the network 120 can be a wired network such as, for example, an Ethernet network, a digital subscription line ("DSL") network, a broadband network, and/or a fiber-optic network. In some instances, the network 120 can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 120 can be encrypted or unencrypted. In some instances, the network 120 can include multiple networks or subnetworks operatively coupled to one another by, for example, network bridges, routers, switches, gateways and/or the like.

The IOT compute device 140 includes a processor 141 operatively coupled to a memory 143 (e.g., via a system bus). The IOT compute device 140 can be any type of internet-of-things device, such as a camera, television, appliance, wearable device, sensor, actuator (e.g., door lock), and/or the like. In some instances, the IOT compute device 140 is not a desktop, laptop, tablet, or mobile device. In some instances, the IOT compute device 140 is at least one of a desktop, laptop, tablet, or mobile device.

The processor 141 can be, for example, a hardware-based integrated circuit (IC) or any other suitable processing device configured to run and/or execute a set of instructions or code. For example, the processor 141 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 141 can be configured to run any of the methods and/or portions of methods discussed herein.

The memory 143 can be, for example, a random-access memory (RAM), a memory buffer, a hard drive, a read-only memory (ROM), an erasable programmable read-only memory (EPROM), and/or the like. The memory 143 can be configured to store any data used by the processor 141 to perform the techniques (methods, processes, etc.) discussed herein. For example, memory 143 can include a SD card (e.g., to store images and/or video captured by IOT compute device 130). In some instances, the memory 143 can store, for example, one or more software programs and/or code that can include instructions to cause the processor 141 to perform one or more processes, functions, and/or the like. In some implementations, the memory 143 can include extendible storage units that can be added and used incrementally. In some implementations, the memory 143 can be a portable memory (for example, a flash drive, a portable hard disk, a SD card, and/or the like) that can be operatively coupled to the processor 141. In some instances, the memory 143 can be remotely operatively coupled with a compute device (not shown in FIG. 1).

The anomaly detection compute device 100 includes a processor 101 operatively coupled to a memory 103 (e.g., via a system bus). The anomaly detection compute device 100 can be any type of compute device, such as a server, desktop, laptop, table, phone, internet-of-things device, and/or the like. The anomaly detection compute device 100 can be used to determine baseline metrics associated with the IOT compute device 140 before a firmware release, and determine updated metrics associated with the IOT compute device 140 after the firmware release. In some instances, a firmware release is the act of releasing a firmware. In some instances, a firmware release results in the IOT compute device 140 storing and/or using the newly-delivered firmware, and replacing the prior firmware with the newly-delivered firmware. The anomaly detection compute device 100 can then be used to compare the baseline metrics and the updated metrics to determine if there is an anomaly at the IOT compute device 140 and/or the firmware release.

In some instances, an anomaly refers to the difference between a metric's baseline value (e.g., before storing the newly-delivered firmware) and updated value (e.g., after storing the newly-delivered firmware) being greater than a predetermined threshold (e.g., 1%, 5%, 10%, 25%, 33%, 50%, 75%, 100%, and/or the like) associated with that metric. Different metrics can have the same thresholds and/or different thresholds. For example, an anomaly can determine to exist if the central processing unit efficiency at IOT compute device 140 increases and/or decreases more than X% (e.g., 10%, 25%, 50%, and/or the like) after the firmware release, a load amount at IOT compute device 140 increases and/or decreases more than Y% (e.g., 10%, 25%, 50%, and/or the like) after the firmware release, a network traffic amount at IOT compute device 140 increases and/or decrease more than Z% (e.g., 10%, 25%, 50%, and/or the like) after the firmware release, and/or the like. In some instances, a threshold associated with a metric can be made known via a human (e.g., a user provides the threshold(s)). In some instances, a threshold associated with a metric can be determined without human intervention; for example, the threshold associated with a metric can be determined using an equation that is a function of the metric's type, IOT compute device 140 type/model, mean or median values of that metric collected by other devices (e.g., that are of the same model at IOT compute device 140), and/or the like.

The processor 101 can be, for example, a hardware-based integrated circuit (IC) or any other suitable processing device configured to run and/or execute a set of instructions or code. For example, the processor 101 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 101 can be configured to run any of the methods and/or portions of methods discussed herein.

The memory 103 can be, for example, a random-access memory (RAM), a memory buffer, a hard drive, a read-only memory (ROM), an erasable programmable read-only memory (EPROM), and/or the like. The memory 103 can be configured to store any data used by the processor 101 to perform the techniques (methods, processes, etc.) discussed herein. In some instances, the memory 103 can store, for example, one or more software programs and/or code that can include instructions to cause the processor 101 to perform one or more processes, functions, and/or the like. In some implementations, the memory 103 can include extendible storage units that can be added and used incrementally. In some implementations, the memory 103 can be a portable memory (for example, a flash drive, a portable hard disk, and/or the like) that can be operatively coupled to the processor 101. In some instances, the memory 103 can be remotely operatively coupled with a compute device (not shown in FIG. 1).

The memory 103 can include (e.g., store) a first set of values 105. The first set of values 105 can include values for a set of metrics collected at IOT compute device 140 at a time and/or across a period of time (e.g., one minute, one hour, one day, one week, and/or the like) before firmware release 109. For example, the first set of values 105 can include representations of values for metrics such as a central processing unit efficiency at IOT compute device 140, a load amount at IOT compute device 140, a network traffic amount at IOT compute device 140, and/or the like. In some instances, the first set of values 105 includes intrinsic and/or extrinsic parameters of the IOT compute device 140. In some instances, the first set of values 105 can include, for each metric from a set of metrics, multiple values for that metric collected and/or measured at different times. After the IOT compute device 140 has collected the first set of values 105, a representation of the first set of values 105 can be sent from the IOT compute device 140 to the anomaly detection compute device 100. In some instances, the first set of values 105 for IOT compute device 140 does not include values collected by IOT compute devices other than the IOT compute device 140.

The memory 103 can include (e.g., store) a first set of statistical properties 107. The first set of statistical properties 107 can represent statistical properties (e.g., mean, median, standard deviation, range, first quartile, third quartile, z-score, delta, etc.) associated with the first set of values 105. In some implementations, where the first set of values 105 includes multiple values for each metric from a plurality of metrics collected and/or measured at different times, a set of statistical properties can be determined for that metric. For example, a first mean and first standard deviation can be determined based on a plurality of central processing unit efficiency measurements at IOT compute device 140 across a period of time before the firmware release 109, a second mean and second standard deviation can be determined based on a plurality of load amount measurements at IOT compute device 140 across the same period of time, a third mean and third standard deviation can be determined based on a plurality of network traffic amount measurements at IOT compute device 140 across the same period of time, and/or the like. The first set of statistical properties 107 can be computed at IOT compute device 140, anomaly detection compute device 100, and/or a compute device not shown in FIG. 1.

The memory 103 can include (e.g., store) a firmware release 109. The firmware release 109 can be a firmware release to be released to IOT compute device 140. In some instances, the firmware release 109 is also sent to other compute devices instead of and/or in addition to IOT compute device 140. In some instances, the IOT compute device 140 is a camera and the firmware release 109 is sent to a plurality of cameras that includes the IOT compute device 140. The IOT compute device 140 can update accordingly in response to receiving a representation of the firmware release 109.

In some instances, the firmware release 109 is not sent to IOT compute device 140 from anomaly detection compute device 100, but rather to IOT compute device 140 from a compute device not shown in FIG. 1. In some instances, any other type of release (e.g., software release, hardware release, etc.) can occur at IOT compute device 140. For example, rather than a firmware release 109 from anomaly detection compute device 100 to IOT compute device 140, a hardware update may occur at IOT compute device 140 (e.g., via a technician).

The memory 103 can include a second set of values 111. The second set of values 111 can include values for a set of metrics (the same set of metrics as the first set of values 105) collected at IOT compute device 140 at a time and/or across the same period of time (e.g., one minute, one hour, one day, one week, one month, three months, and/or the like) after the firmware release 109 (e.g., and before a subsequent firmware release). For example, the second set of values 111 can include representations of values for metrics such as a central processing unit efficiency at IOT compute device 140, a load amount at IOT compute device 140, a network traffic amount at IOT compute device 140, and/or the like after the firmware release 109. In some instances, the second set of values 111 includes intrinsic and/or extrinsic parameters of the IOT compute device 140. In some instances, the second set of values 111 can include, for each metric from a set of metrics, multiple values for that metric collected and/or measured at different times. After the IOT compute device 140 has collected the second set of values 111, a representation of the second set of values 111 can be sent from the IOT compute device 140 to the anomaly detection compute device 100. In some instances, the second set of values 111 for IOT compute device 140 does not include values collected by IOT compute devices other than the IOT compute device 140. The second set of values 111 can be the same as the first set of values 105, or be different than the first set of values 105.

The memory 103 can include (e.g., store) a second set of statistical properties 113. The second set of statistical properties 113 can represent statistical properties (the same set of statistical properties as the first set of statistical properties 107) associated with the second set of values 111. In some implementations, where the second set of values 113 includes multiple values for each metric from a plurality of metrics collected and/or measured at different time, a set of statistical properties can be determined for that metric. For example, a first mean and first standard deviation can be determined based on a plurality of central processing unit efficiency measurements at IOT compute device 140 across a period of time after the firmware release 109, a second mean and second standard deviation can be determined based on a plurality of load amount measurements at IOT compute device 140 across the same period of time, a third mean and third standard deviation can be determined based on a plurality of network traffic amount measurements at IOT compute device 140 across the same period of time, and/or the like. The second set of statistical properties 113 can be computed at IOT compute device 140, anomaly detection compute device 100, and/or a compute device not shown in FIG. 1.

The first set of statistical properties 107 and the second set of statistical properties 113 can be compared to determine if there is an anomaly at firmware release 109 and/or IOT compute device 140. The first set of statistical properties 107 can act as a baseline set of values that can be compared to the second set of statistical properties 113 (acting as a current/updated set of values). In some implementations, statistical properties can be compared for each metric from the set of metrics associated with the first set of statistical properties 107 and the second set of statistical properties 113. For example, the first mean and first standard deviation of central processing unit efficiency measurements at IOT compute device 140 included in the first set of statistical properties 107 can be compared to the first mean and first standard deviation of central processing unit efficiency measurements at IOT compute device 140 included in the second set of statistical properties 113. If the difference between values is larger than a predetermined threshold (e.g., more than 10% different, more than 25% different, more than 33% different, more than 50% different, and/or the like) after the comparing, an anomaly can be determined to exist. In some implementations, comparing the first set of statistical properties 107 and the second set of statistical properties 113 can include computing, for each pair of values for a metric from the set of metrics, a z-score (e.g., $(x-\mu/\sigma)$) and/or delta value (e.g., $x-\mu$). If the z-score and/or delta value is outside a predetermined acceptable range (e.g., greater than a predetermined threshold), an anomaly can be determined to exist.

In some implementation, the first set of statistical properties 107 and the second set of statistical properties 113 can be compared to determine if there is an anomaly at firmware release 109 and/or IOT compute device 140 at anomaly detection compute device 100 and not at other compute devices. Comparing to determine if there is an anomaly locally within the anomaly detection compute device 100 and not at other compute devices can provide data privacy. Moreover, where the IOT devices have less processing power and/or memory capability than the anomaly detection compute device 100, comparing the first set of statistical properties 107 and the second set of statistical properties 113 at anomaly detection compute device 100 can allow an anomaly to be detected faster (i.e., with lower latency) and allow the processing and data to be offloaded from the IOT devices.

In some implementations, the first set of statistical properties 107 and the second set of statistical properties 113 can be compared to determine if there is an anomaly at firmware release 109 and/or IOT compute device 140 without comparing statistical properties of other IOT compute devices. In some implementations, the first set of statistical properties 107 and the second set of statistical properties 113 can be compared to determine if there is an anomaly at firmware release 109 and/or IOT compute device 140 while also considering statistical properties of other IOT compute devices (e.g., other IOT compute devices that are the same model, or other IOT compute devices that are the same model but executing different firmware versions).

In some implementations, the first set of statistical properties 107 and the second set of statistical properties 113 can be compared to determine a confidence score that indicates a confidence that an anomaly is (or is not) present. The confidence score can be determined based on the first set of statistical properties 107 and the second set of statistical properties 113. For example, a larger z-score and/or delta value can cause the confidence score to increase, while a smaller z-score and/or delta value can cause the confidence score to decrease.

A remedial action can occur (or be caused or triggered) in response to detecting an anomaly. In some instances, the anomaly detection compute device 100 sends a signal (e.g., electronic signal) to IOT compute device 140 to cause the IOT compute device 140 to perform a remedial action (e.g., automatically and without requiring human intervention). Any type of remedial action can occur that mitigates a risk associated with the anomaly. For example, the IOT compute device 140 can be caused to change of mode of operation (e.g., shut down, operate in a safe mode, and/or the like). As another example, the anomaly detection compute device 100 can send signals to other compute devices (e.g., those that also received firmware release 109) indicating that the firmware release 109 has (or potentially has) an anomaly. In some implementations, the anomaly detection compute device 100 can send a signal to a compute device not shown in FIG. 1 indicating the detection of the anomaly (e.g., to a compute device of a cybersecurity analyst).

Although not shown in FIG. 1, in some implementations, the anomaly detection compute device 100 can detect an anomaly for a compute device and/or multiple compute devices not shown in FIG. 1. For example, the anomaly detection compute device 100 can detect anomalies for compute devices that are all the same model and/or compute devices that are different models. In some instances, where the anomaly detection compute device 100 detects anomalies for compute devices that are all the same model, the type of metrics and statistical properties measured and/or stored at memory 103 can be the same for each of the compute devices (e.g., the mean and standard deviation central processing unit efficiency value is calculated for each camera from a plurality of cameras that are all the same model). In some instances, where the anomaly detection compute device 100 detects anomalies for compute devices that are not all the same model, the type of metrics and statistical properties measured and/or stored at memory 103 can be different (but does not have to be) for each of the different compute devices (e.g., the mean and standard deviation central processing unit efficiency value is calculated for camera model X, while the mean and standard deviation central processing unit efficiency value is not calculated for camera model Y).

In some implementations, the IOT compute device 140 can collect/measure additional values (e.g., after a firmware release subsequent to firmware release 109). In some instances, an additional set of statistical properties can be calculated for those additional values. The additional set of statistical properties can act as the current/updated set of values, and can be compared to the first set of statistical properties 107 and/or second set of statistical properties 113 to determine if an anomaly exists.

Although aspects of FIG. 1 were discussed with respect to an anomaly being detected at IOT device, in some implementations, an anomaly can be detected at a non-IOT device. For example, the first set of values 105 and/or second set of values 111 can be collected and stored manually at anomaly detection compute device 100 instead of being received wireless over network 120.

FIG. 2 shows an example of metrics and statistical properties associated with a camera, according to an embodiment. Column 201 indicates the camera_id. The camera_id can be, for example, a unique string associated with the camera. In other words, the camera_id uniquely identifies the camera. As shown in FIG. 2, each row in column 201 indicates the same camera—8359ca11-8c73-47. Column 203 indicates release name. The release name can indicate, for example, a firmware that was released to the camera. As shown in FIG. 2, each row in column 203 indicates the same firmware release—overflow-1-2. Column 205 indicates metric name. Each row in column 205 can indicate, for example, a type of metric. As shown in FIG. 2, each row in column 205 indicates a different metric—avg_idle_cpu, p70_sys_cpu, p75_idle_cpu, p70_user_cpu, and p50_sys_cpu. Column 207 indicates mean. For each metric listed in column 205, the mean can indicate, for example, the mean value for all values of that metric collected by camera 8359ca11-8c73-47 after firmware release overflow-1-2 and within a predetermined period of time (e.g., one day). Column 209 indicates stddev. For each metric listed in column 209, the stddev can indicate, for example, the standard deviation value for all values of that metric collected by camera 8359ca11-8c73-47 after firmware release overflow-1-2 and within the predetermined period of time. Column 211 indicates samp. Samp can indicate, for example, the number of samples that were used to calculate the mean and standard deviation for each metric listed in column 205. Column 213 can indicate date. Date can indicate, for example, the date on which the samples listed in column 211 were collected and/or received.

FIG. 3 shows an example of metrics and statistical properties associated with multiple different cameras, according to an embodiment. Column 301 lists various camera_ids, each camera_id for example identifying a unique camera. Here, column 301 indicates four different cameras. Column 303 lists a baseline_release, indicating for example a firmware operating in a given camera from column 301 prior to a new firmware release to that camera. Column 305 lists a current release, indicating for example a firmware operating in a given camera from column 301 after the new firmware release to that camera. As shown in FIG. 3, each camera represented in column 301 had the same baseline release and current release. Column 307 lists metric name. Each row in column 307 can indicate, for example, a type of metric measured for an associated camera_id listed in column 301. For example, a value for metric p70_iowait_cpu was calculated for camera 8359ca11-8c73-47. Column 309 lists a measured value for a metric listed in column 307. For example, camera_id 8359ca11-8c73-47 had metric_name p70_iowait_cpu with value 0.001640086. Column 311 lists the mean for all values of a given camera_id's metric. Column 313 lists the standard deviation value for all values of a given camera_id's metric. Column 315 lists the z-score for all values of a given camera_id's metric. Column 317 lists the delta for all values of a given camera_id's metric. Column 319 lists the date when values used to determine the values in columns 309, 311, 313, 315, and 317 were calculated and/or collected.

FIG. 4 shows an example of statistical values associated with a plurality of cameras that are all the same model across a range of dates, according to an embodiment. A current value, baseline value, and metric are listed for each metric listed under "Metric Name." The baseline value can indicate a statistical value (e.g., mean, z-score, and/or the like) for an associated metric associated with the plurality of cameras prior to a firmware release. The current value can indicate a statistical value (e.g., mean, z-score, and/or the like) for an associated metric associated with the plurality of cameras after the firmware release. The delta can represent a difference between the current and baseline values. For example, on Apr. 23, 2022, for all cameras of a given model, the cameras had a mean value of 7.8 max_15min_load after a firmware release, and 6.531 max_15min_load before the firmware release. In some instances, the information shown in FIG. 4 can be used to predict if an anomaly was caused by a firmware release based on statistical properties collected/measured by a IOT compute device (e.g., IOT compute device 140) that the same model as those used to determine the values shown in FIG. 4. Said differently, statistical properties calculated based on values collected/measured by an IOT device can be compared to statistical properties calculated based on values collected/measured by a plurality of other IOT devices being the same model type to detect an anomaly.

FIG. 5 shows a flowchart of a method 500 for causing (or triggering) a remedial action in response to detecting an anomaly, according to an embodiment. In some implementations, method 500 is performed by a processor (e.g., processor 101).

At 501, a first set of values (e.g., first set of values 105) reported by an electronic device (e.g., IOT compute device 140) over a first period of time that is prior to a firmware release (e.g., firmware release 109) to the electronic device is received. The first set of values is associated with a plurality of metrics (e.g., a central processing unit efficiency, a load amount, a network traffic amount, and/or the like). In some implementations, the electronic device is a camera. In some implementations, values being reported by an electronic device refers to values of operational parameters (e.g., values measured by sensors, intrinsic parameters, extrinsic parameters, etc.) of the electronic device that are measured and/or captured by the electronic device and then provided, for example, to a compute device (e.g., anomaly detection compute device 100). At 502, for each metric from the plurality of metrics, a set of statistical properties associated with a subset of values (e.g., included in first set of statistical properties 107) included in the first set of values that are associated with that metric are determined. In some implementations, 502 occurs automatically (e.g., without requiring human intervention) in response to completing 501. At 503, a second set of values (e.g., second set of values 111) reported by the electronic device over a second period of time that is after the firmware release is received. The second set of values is associated with the plurality of metrics. At 504, for each metric from the plurality of metrics, a set of statistical properties associated with a subset of values included in the second set of values (e.g., included in second set of statistical properties 113) that are associated with that metric are determined. In some implementations, 504 occurs automatically (e.g., without requiring human intervention) in response to completing 503. At 505, for each metric from the plurality of metrics, to detect an anomaly associated with at least one of the firmware release or the electronic device, and without using a third set of values that are associated with that metric and reported by a different electronic device that is not the electronic device, (1) the set of statistical properties associated with the subset of values included in the first set of values associated with that metric and (2) the set of statistical properties associated with the subset of values included in the second set of values associated with that metric are compared. In some implementations, 505 occurs automatically (e.g., without requiring human intervention) in response to completing 504. At 506, in response to detecting the anomaly, a signal to cause a remedial action (e.g., causing a mode of operation of the electronic device to change, causing a mode of operation of firmware of the firmware release to change) is sent automatically (e.g., without requiring human intervention) in response to detecting the anomaly.

In some implementations of method 500, for each metric from the plurality of metrics: the set of statistical properties associated with the subset of values included in the first set of values that are associated with that metric include (1) a mean value of the subset of values included in the first set of values that are associated with that metric and (2) a standard deviation value of the subset of values included in the first set of values that are associated with that metric; and the set of statistical properties associated with the subset of values included in the second set of values that are associated with that metric include (1) a mean value of the subset of values included in the second set of values that are associated with that metric, (2) a standard deviation value of the subset of values included in the second set of values that are associated with that metric.

In some implementations of method 500, the firmware release is a first firmware release, the anomaly is a first anomaly, the signal is a first signal, and the remedial action is a first remedial action. Some implementations of method 500 further include receiving, after a second firmware release to the electronic device that is after the first firmware release, a third set of values (1) reported by the electronic device over a third period of time that is after the second firmware release and (2) associated with the plurality of metrics. Some implementations of method 500 further include determining, for each metric from the plurality of metrics, a set of statistical properties associated with a subset of values included in the third set of values that are associated with that metric. Some implementations of method 500 further include comparing, for each metric from the plurality of metrics and to detect a second anomaly associated with at least one of the second firmware release or the electronic device, the set of statistical properties associated with the second set of values with the set of statistical properties associated with the third set of values. Some implementations of method 500 further include sending, in response to detecting the second anomaly, a second signal to cause a second remedial action.

In some implementations of method 500, the firmware release is a first firmware release, the anomaly is a first anomaly, the signal is a first signal, and the remedial action is a first remedial action. Some implementations of method 500 further include receiving, after a second firmware release to the electronic device that is after the first firmware release, a third set of values (1) reported by the electronic device over a third period of time that is after the second firmware release and (2) associated with the plurality of metrics. Some implementations of method 500 further include determining, for each metric from the plurality of metrics, a set of statistical properties associated with a subset of values included in the third set of values that are associated with that metric. Some implementations of method 500 further include comparing, for each metric from the plurality of metrics and to detect a second anomaly associated with at least one of the second firmware release or the electronic device, the set of statistical properties associated with the first set of values with the set of statistical properties associated with the third set of values. Some implementations of method 500 further include sending, in response to detecting the second anomaly, a second signal to cause a second remedial action.

In some implementations of method 500, the electronic device is a first electronic device, the firmware release is further to a second electronic device (i.e., the firmware release releases firmware to the first electronic device and the second electronic device), the plurality of metrics is a first plurality of metrics, the signal is a first signal, and the remedial action is a first remedial action. Some implementations of method 500 further include receiving a third set of values reported by the second electronic device over the first period of time. The third set of values is associated with a second plurality of metrics not identical to the first plurality of metrics. The second electronic device is of an electronic device type. Some implementations of method 500 further include determining, for each metric from the second plurality of metrics, a set of statistical properties associated with a subset of values included in the third set of values that are associated with that metric. Some implementations of method 500 further include receiving a fourth set of values reported by the second electronic device over the second period of time. The fourth set of values is associated with the second plurality of metrics. Some implementations of method 500 further include determining, for each metric from the second plurality of metrics, a set of statistical properties associated with a subset of values included in the third set of values that are associated with that metric. Some implementations of method 500 further include computing, for each metric from the second plurality of metrics, an anomaly confidence score (1) associated with at least one of the firmware release or the second electronic device, and (2) determined based on (i) the set of statistical properties associated with the subset of values included in the third set of values associated with that metric, (ii) the set of statistical properties associated with the subset of values included in the fourth set of values associated with that metric, and (iii) an anomaly ratio associated with that metric for a set of electronic devices being of the electronic device type (e.g., where the anomaly ratio can be the ratio of the number electronic devices from the set of electronic devices being of the electronic device type determined to have an anomaly to the number of electronic devices from the set of electronic devices being of the electronic device type determined to not have an anomaly). Some implementations of method 500 further include sending, automatically in response to the anomaly confidence score for each metric from the second plurality of metrics being outside a predetermined range, a second signal to cause a second remedial action.

FIG. 6 shows a flowchart of a method 600 for causing a remedial action in response to detecting an anomaly, according to an embodiment. In some implementations, method 600 is performed by a processor (e.g., processor 101).

At 601, a first set of values (e.g., first set of values 105) reported by an electronic device (e.g., IOT compute device 140) and not reported by another electronic device over a first period of time that is prior to a firmware release to the electronic device is received. The first set of values are associated with a metric. In some implementations, values being reported by an electronic device refers to values of operational parameters (e.g., values measured from sensors, intrinsic parameters, extrinsic parameters, etc.) of the electronic device that are measured and/or captured by the electronic device and then provided, for example, to a compute device (e.g., anomaly detection compute device 100; although the compute device (e.g., anomaly detection compute device 100) can receive values reported by other electronic devices, those values reported by the other electronic devices are not included in first set of values. At 602, a set of statistical properties associated with the first set of values is determined. In some implementations, 602 occurs automatically (e.g., without requiring human intervention) in response to completing 601. At 603, a second set of values reported by the electronic device and not reported by another electronic device over a second period of time that is after the firmware release is received. The second set of values is associated with the metric. Values reported by the another electronic device can be received, or not received—those values, however, are not included in the second set of values. At 604, a set of statistical properties associated with the second set of values is determined. In some implementations, 604 occurs automatically (e.g., without requiring human intervention) in response to completing 603. At 605, the set of statistical properties associated with the first set of values and the set of statistical properties associated with the second set of values is compared. In some implementations, 605 occurs automatically (e.g., without requiring human intervention) in response to completing 604. At 606, an anomaly associated with at least one of the firmware release or the electronic device is detected based on comparing the set of statistical properties associated with the first set of values and the set of statistical properties associated with the second set of values. In some implementations, 606 occurs automatically (e.g., without requiring human intervention) in response to completing 605. At 607, a signal to cause a remedial action (e.g., a mode of operation of the plurality of electronic device to change and/or a mode of operation of the firmware release to change) is sent (e.g., automatically and without requiring human intervention) in response to detecting the anomaly.

In some implementations of method 600, the firmware release is a first firmware release and the metric is a first metric. Some implementations of method 600 further include receiving, prior to a second firmware release to the electronic device that is after the first firmware release, a third set of values (1) reported by the electronic device over a third period of time after the second period of time and (2) associated with a second metric. Some implementations of method 600 further include determining a set of statistical properties associated with the third set of values. Some implementations of method 600 further include receiving, after the second firmware release to the electronic device, a fourth set of values (1) reported by the electronic device over a fourth period of time after the third period of time and (2) associated with the second metric. Some implementations of method 600 further include determining a set of statistical properties associated with the fourth set of values. Some implementations of method 600 further include comparing the set of statistical properties associated with the third set of values and the set of statistical properties associated with the fourth set of values. Some implementations of method 600 further include detecting that an anomaly associated with at least one of the second firmware release or the electronic device does not exist based on comparing the set of statistical properties associated with the third set of values and the set of statistical properties associated with the fourth set of values.

In some implementations of method 600, the electronic device is a first electronic device being a first model, the firmware release is a first firmware release, the metric is a first metric, the anomaly is a first anomaly, the signal is a first signal, and the remedial action is a first remedial action. Some implementations of method 600 further include receiving, prior to a second firmware release to a second electronic device that is a second model different than the first model, a third set of values (1) reported by the second electronic device over a third period of time and (2) associated with a second metric. Some implementations of method 600 further include determining a set of statistical properties associated with the third set of values. Some implementations of method 600 further include receiving, after the second firmware release to the second electronic device, a fourth set of values (1) reported by the second electronic device over a fourth period of time after the third period of time and (2) associated with the second metric. Some implementations of method 600 further include determining a set of statistical properties associated with the fourth set of values. Some implementations of method 600 further include comparing the set of statistical properties associated with the third set of values and the set of statistical properties associated with the fourth set of values. Some implementations of method 600 further include detecting a second anomaly associated with at least one of the second firmware release or the second electronic device based on comparing the set of statistical properties associated with the third set of values and the set of statistical properties associated with the fourth set of values. Some implementations of method 600 further include sending, in response to detecting the second anomaly, a second signal to cause a second remedial action.

In some implementations of method 600, the electronic device is a first electronic device associated with a model type, the firmware release is further to a second electronic device associated with the model type, the anomaly is a first anomaly, the signal is a first signal, and the remedial action is a first remedial action. Some implementations of method 600 further include receiving a third set of values (1)

reported by the second electronic device over the first period of time and (2) associated with the metric. Some implementations of method 600 further include determining a set of statistical properties associated with the third set of values. Some implementations of method 600 further include receiving a fourth set of values (1) reported by the second electronic device over the second period of time and (2) associated with the metric. Some implementations of method 600 further include determining a set of statistical properties associated with the fourth set of values. Some implementations of method 600 further include comparing the set of statistical properties associated with the third set of values and the set of statistical properties associated with the fourth set of values. Some implementations of method 600 further include detecting a second anomaly associated with at least one of the firmware release or the second electronic device based on comparing the set of statistical properties associated with the third set of values and the set of statistical properties associated with the fourth set of values. Some implementations of method 600 further include sending, in response to detecting the second anomaly, a second signal to cause a second remedial action.

FIGS. 7A-7B show a flowchart of a method 700 for causing a remedial action in response to detecting an anomaly, according to an embodiment. In some implementations, method 700 is performed by a processor (e.g., processor 101).

At 701, a first plurality of sets of values (e.g., including first set of values 105) is received. The first plurality of sets of values is reported by a plurality of electronic devices (e.g., including IOT compute device 140) over a first period of time that is prior to a firmware release (e.g., firmware release 109) to the plurality of electronic devices. The first plurality of sets of values is associated with a set of metrics. Each set of values from the first plurality of sets of values is associated with an electronic device from the plurality of electronic devices different than remaining sets of values from the first plurality of sets of values. In some implementations of 701, the plurality of electronic devices are of the same electronic device model. In some implementation of 701, the plurality of electronic devices are associated with (e.g., owned by, monitored by, manufactured by, data accessible by, and/or the like) the same organization.

At 702, for each set of values from the first plurality of sets of values, for each metric from the set of metrics, and to generate a first plurality of sets of statistical properties (e.g., including first set of statistical properties 107) associated with the first plurality of sets of values, a set of statistical properties associated with a subset of values included in that set of values that are associated with that metric is determined. In some implementations, 702 occurs automatically (e.g., without requiring human intervention) in response to completing 701.

At 703, a second plurality of sets of values (e.g., including second set of values 111) reported by the plurality of electronic devices over a second period of time that is after the firmware release is received. The second plurality of sets of values is associated with the set of metrics. Each set of values from the second plurality of sets of values is associated with an electronic device from the plurality of electronic devices different than remaining sets of values from the second plurality of sets of values. In some implementations, a duration of the first period of time is substantially (e.g., within 1%, within 5%, within 10%, etc.) identical to a duration of the second period of time At 704, for each set of values from the second plurality of sets of values, a determination is made, for each metric from the set of metrics and to generate a second plurality of sets of statistical properties (e.g., including second set of statistical properties 113) associated with the second plurality of sets of values, a set of statistical properties associated with a subset of values included in that set of values that are associated with that metric. In some implementations, 704 occurs automatically (e.g., without requiring human intervention) in response to completing 703.

At 705, an anomaly is determined, for an electronic device included in the plurality of devices, (1) based on comparing the set of statistical properties associated with the subset of values included in the first set of values that are associated with a metric included in the plurality of metrics with the set of statistical properties associated with the subset of values included in the second set of values that are associated with the metric and (2) that is associated with at least one of the firmware release or the electronic device. The comparing occurs without consideration of (a) remaining sets of statistical properties included in the first plurality of sets of statistical properties different than the set of statistical properties associated with the subset of values included in the first set of values that are associated with the metric and (b) remaining sets of statistical properties included in the second plurality of sets of statistical properties different than the set of statistical properties associated with the subset of values included in the second set of values that are associated with the metric. In some implementations, 705 occurs automatically (e.g., without requiring human intervention) in response to completing 704.

At 706, a signal to cause a remedial action (e.g., causing a mode of operation of the plurality of electronic devices to change, causing a mode of operation of firmware of the firmware release to change, and/or the like) is sent in response to determining the anomaly. In some implementations, 706 occurs automatically (e.g., without requiring human intervention) in response to completing 705.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. A method, comprising:
receiving, via a processor, a first set of values reported by an electronic device over a first period of time that is prior to a firmware release to the electronic device, the first set of values associated with a plurality of metrics;
determining, via the processor and for each metric from the plurality of metrics, a set of statistical properties associated with a subset of values included in the first set of values that are associated with that metric;
receiving, via the processor, a second set of values reported by the electronic device over a second period of time that is after the firmware release, the second set of values associated with the plurality of metrics;
determining, via the processor and for each metric from the plurality of metrics, a set of statistical properties associated with a subset of values included in the second set of values that are associated with that metric;
comparing, via the processor, for each metric from the plurality of metrics, to detect an anomaly associated with at least one of the firmware release or the electronic device, and without using a third set of values that are associated with that metric and reported by a different electronic device that is not the electronic device, (1) the set of statistical properties associated with the subset of values included in the first set of values associated with that metric with (2) the set of statistical properties associated with the subset of values included in the second set of values associated with that metric; and
sending, via the processor and automatically in response to detecting the anomaly, a signal to cause a remedial action.

2. The method of claim 1, wherein the electronic device is a camera.

3. The method of claim 1, wherein the plurality of metrics include at least one of a central processing unit efficiency, a load amount, or a network traffic amount.

4. The method of claim 1, wherein the remedial action includes causing a mode of operation of the electronic device to change.

5. The method of claim 1, wherein the remedial action includes causing a mode of operation of firmware of the firmware release to change.

6. The method of claim 1, wherein:
for each metric from the plurality of metrics:
the set of statistical properties associated with the subset of values included in the first set of values that are associated with that metric include (1) a mean value of the subset of values included in the first set of values that are associated with that metric and (2) a standard deviation value of the subset of values included in the first set of values that are associated with that metric; and
the set of statistical properties associated with the subset of values included in the second set of values that are associated with that metric include (1) a mean value of the subset of values included in the second set of values that are associated with that metric, (2) a standard deviation value of the subset of values included in the second set of values that are associated with that metric.

7. The method of claim 1, wherein the firmware release is a first firmware release, the anomaly is a first anomaly, the signal is a first signal, the remedial action is a first remedial action, and the method further comprises:
receiving, via the processor and after a second firmware release to the electronic device that is after the first firmware release, a third set of values (1) reported by the electronic device over a third period of time that is after the second firmware release and (2) associated with the plurality of metrics;
determining, via the processor and for each metric from the plurality of metrics, a set of statistical properties associated with a subset of values included in the third set of values that are associated with that metric;
comparing, via the processor, for each metric from the plurality of metrics, and to detect a second anomaly associated with at least one of the second firmware release or the electronic device, the set of statistical properties associated with the second set of values with the set of statistical properties associated with the third set of values; and
sending, via the processor and in response to detecting the second anomaly, a second signal to cause a second remedial action.

8. The method of claim 1, wherein the firmware release is a first firmware release, the anomaly is a first anomaly, the signal is a first signal, the remedial action is a first remedial action, and the method further comprises:
receiving, via the processor and after a second firmware release to the electronic device that is after the first firmware release, a third set of values (1) reported by the electronic device over a third period of time that is after the second firmware release and (2) associated with the plurality of metrics;
determining, via the processor and for each metric from the plurality of metrics, a set of statistical properties associated with a subset of values included in the third set of values that are associated with that metric;
comparing, via the processor, for each metric from the plurality of metrics, and to detect a second anomaly associated with at least one of the second firmware release or the electronic device, the set of statistical properties associated with the first set of values with the set of statistical properties associated with the third set of values; and
sending, via the processor and in response to detecting the second anomaly, a second signal to cause a second remedial action.

9. The method of claim 1, wherein the electronic device is a first electronic device, the firmware release is further to a second electronic device, the plurality of metrics is a first plurality of metrics, the signal is a first signal, the remedial action is a first remedial action, and the method further comprises:
  receiving, via the processor, a third set of values reported by the second electronic device over the first period of time, the third set of values associated with a second plurality of metrics not identical to the first plurality of metrics, the second electronic device being of an electronic device type;
  determining, via the processor and for each metric from the second plurality of metrics, a set of statistical properties associated with a subset of values included in the third set of values that are associated with that metric;
  receiving, via the processor, a fourth set of values reported by the second electronic device over the second period of time, the fourth set of values associated with the second plurality of metrics;
  determining, via the processor and for each metric from the second plurality of metrics, a set of statistical properties associated with a subset of values included in the third set of values that are associated with that metric;
  computing, via the processor and for each metric from the second plurality of metrics, an anomaly confidence score (1) associated with at least one of the firmware release or the second electronic device, and (2) determined based on (i) the set of statistical properties associated with the subset of values included in the third set of values associated with that metric, (ii) the set of statistical properties associated with the subset of values included in the fourth set of values associated with that metric, and (iii) an anomaly ratio associated with that metric for a set of electronic devices being of the electronic device type; and
  sending, via the processor and automatically in response to the anomaly confidence score for each metric from the second plurality of metrics being outside a predetermined range, a second signal to cause a second remedial action.

10. A non-transitory processor-readable medium storing code representing instructions to be executed by one or more processors, the instructions comprising code to cause the one or more processors to:
  receive a first set of values reported by an electronic device and not reported by another electronic device over a first period of time that is prior to a firmware release to the electronic device, the first set of values associated with a metric;
  determine a set of statistical properties associated with the first set of values;
  receive a second set of values reported by the electronic device and not reported by another electronic device over a second period of time that is after the firmware release, the second set of values associated with the metric;
  determine a set of statistical properties associated with the second set of values;
  compare the set of statistical properties associated with the first set of values and the set of statistical properties associated with the second set of values;
  detect an anomaly associated with at least one of the firmware release or the electronic device based on comparing the set of statistical properties associated with the first set of values and the set of statistical properties associated with the second set of values; and
  send, in response to detecting the anomaly, a signal to cause a remedial action.

11. The non-transitory processor-readable medium of claim 10, wherein the firmware release is a first firmware release, the metric is a first metric, and the code further comprises code to cause the one or more processors to:
  receive, prior to a second firmware release to the electronic device that is after the first firmware release, a third set of values (1) reported by the electronic device over a third period of time after the second period of time and (2) associated with a second metric;
  determine a set of statistical properties associated with the third set of values;
  receive, after the second firmware release to the electronic device, a fourth set of values (1) reported by the electronic device over a fourth period of time after the third period of time and (2) associated with the second metric;
  determine a set of statistical properties associated with the fourth set of values;
  compare the set of statistical properties associated with the third set of values and the set of statistical properties associated with the fourth set of values; and
  detect that an anomaly associated with at least one of the second firmware release or the electronic device does not exist based on comparing the set of statistical properties associated with the third set of values and the set of statistical properties associated with the fourth set of values.

12. The non-transitory processor-readable medium of claim 10, wherein the electronic device is a first electronic device being a first model, the firmware release is a first firmware release, the metric is a first metric, the anomaly is a first anomaly, the signal is a first signal, the remedial action is a first remedial action, and the code further comprises code to cause the one or more processors to:
  receive, prior to a second firmware release to a second electronic device that is a second model different than the first model, a third set of values (1) reported by the second electronic device over a third period of time and (2) associated with a second metric;
  determine a set of statistical properties associated with the third set of values;
  receive, after the second firmware release to the second electronic device, a fourth set of values (1) reported by the second electronic device over a fourth period of time after the third period of time and (2) associated with the second metric;
  determine a set of statistical properties associated with the fourth set of values;
  compare the set of statistical properties associated with the third set of values and the set of statistical properties associated with the fourth set of values;
  detect a second anomaly associated with at least one of the second firmware release or the second electronic device based on comparing the set of statistical properties associated with the third set of values and the set of statistical properties associated with the fourth set of values; and
  send, in response to detecting the second anomaly, a second signal to cause a second remedial action.

13. The non-transitory processor-readable medium of claim 10, wherein the electronic device is a first electronic device associated with a model type, the firmware release is further to a second electronic device associated with the model type, the anomaly is a first anomaly, the signal is a first signal, the remedial action is a first remedial action, and the code further comprises code to cause the one or more processors to:

receive a third set of values (1) reported by the second electronic device over the first period of time and (2) associated with the metric;

determine a set of statistical properties associated with the third set of values;

receive a fourth set of values (1) reported by the second electronic device over the second period of time and (2) associated with the metric;

determine a set of statistical properties associated with the fourth set of values;

compare the set of statistical properties associated with the third set of values and the set of statistical properties associated with the fourth set of values;

detect a second anomaly associated with at least one of the firmware release or the second electronic device based on comparing the set of statistical properties associated with the third set of values and the set of statistical properties associated with the fourth set of values; and send, in response to detecting the second anomaly, a second signal to cause a second remedial action.

14. The non-transitory processor-readable medium of claim 10, wherein the remedial action includes causing at least one of a mode of operation of at least one electronic device from the plurality of electronic devices to change or a mode of operation of firmware of the firmware release to change.

15. An apparatus, comprising:

a memory; and a processor operatively coupled to the memory, the processor configured to:

receive a first plurality of sets of values reported by a plurality of electronic devices over a first period of time that is prior to a firmware release to the plurality of electronic devices, the first plurality of sets of values associated with a set of metrics, each set of values from the first plurality of sets of values associated with an electronic device from the plurality of electronic devices different than remaining sets of values from the first plurality of sets of values;

for each set of values from the first plurality of sets of values, determine, for each metric from the set of metrics and to generate a first plurality of sets of statistical properties associated with the first plurality of sets of values, a set of statistical properties associated with a subset of values included in that set of values that are associated with that metric;

receive a second plurality of sets of values reported by the plurality of electronic devices over a second period of time that is after the firmware release, the second plurality of sets of values associated with the set of metrics, each set of values from the second plurality of sets of values associated with an electronic device from the plurality of electronic devices different than remaining sets of values from the second plurality of sets of values;

for each set of values from the second plurality of sets of values, determine, for each metric from the set of metrics and to generate a second plurality of sets of statistical properties associated with the second plurality of sets of values, a set of statistical properties associated with a subset of values included in that set of values that are associated with that metric;

determine, for an electronic device included in the plurality of electronic devices, an anomaly (1) based on comparing the set of statistical properties associated with the subset of values included in the first set of values that are associated with a metric included in the plurality of metrics with the set of statistical properties associated with the subset of values included in the second set of values that are associated with the metric and (2) that is associated with at least one of the firmware release or the electronic device, the comparing occurring without consideration of (a) remaining sets of statistical properties included in the first plurality of sets of statistical properties different than the set of statistical properties associated with the subset of values included in the first set of values that are associated with the metric and (b) remaining sets of statistical properties included in the second plurality of sets of statistical properties different than the set of statistical properties associated with the subset of values included in the second set of values that are associated with the metric; and send, in response to determining the anomaly, a signal to cause a remedial action.

16. The apparatus of claim 15, wherein the plurality of electronic devices are of the same electronic device model.

17. The apparatus of claim 15, wherein a duration of the first period of time is substantially identical to a duration of the second period of time.

18. The apparatus of claim 15, wherein the remedial action includes causing a mode of operation of the plurality of electronic devices to change.

19. The apparatus of claim 15, wherein the remedial action includes causing a mode of operation of firmware of the firmware release to change.

20. The apparatus of claim 15, wherein the plurality of electronic devices are associated with the same organization.

\* \* \* \* \*